United States Patent
Sishtla

(10) Patent No.: US 7,100,737 B2
(45) Date of Patent: Sep. 5, 2006

(54) MUFFLER FOR NOISE REDUCTION

(75) Inventor: Vishnu M. Sishtla, Manlius, NY (US)

(73) Assignee: Carrier Corporation, Syracuse, NY (US)

( * ) Notice: Subject to any disclaimer, the term of this patent is extended or adjusted under 35 U.S.C. 154(b) by 278 days.

(21) Appl. No.: 10/628,156

(22) Filed: Jul. 28, 2003

(65) Prior Publication Data
US 2005/0023077 A1 Feb. 3, 2005

(51) Int. Cl.
*F01N 1/10* (2006.01)
*F01N 1/04* (2006.01)
*E04F 17/04* (2006.01)
*F01N 7/02* (2006.01)

(52) U.S. Cl. .................. 181/252; 181/256; 181/222

(58) Field of Classification Search .............. 181/252, 181/256, 222, 258, 224, 225, 226
See application file for complete search history.

(56) References Cited

U.S. PATENT DOCUMENTS

| | | | | |
|---|---|---|---|---|
| 1,844,104 A * | 2/1932 | Schnell | ........................ | 181/256 |
| 2,101,460 A * | 12/1937 | Schmidt | ........................ | 181/252 |
| 3,142,354 A * | 7/1964 | Kammerer et al. | .......... | 181/252 |
| 3,174,583 A * | 3/1965 | Giordano | ..................... | 181/252 |
| 3,688,870 A * | 9/1972 | Gibel et al. | ................. | 181/267 |
| 3,802,163 A | 4/1974 | Riojas | | |
| 3,842,932 A * | 10/1974 | Gibel | ......................... | 181/258 |
| 3,949,830 A * | 4/1976 | Muehlbauer et al. | ....... | 181/224 |
| 4,045,157 A * | 8/1977 | Peterson | ..................... | 431/114 |
| 4,134,472 A * | 1/1979 | Trainor | ....................... | 181/258 |
| 4,167,986 A * | 9/1979 | Conway | ..................... | 181/224 |
| 4,252,212 A * | 2/1981 | Meier | ......................... | 181/248 |
| 4,263,982 A * | 4/1981 | Feuling | ...................... | 181/256 |
| 4,316,523 A * | 2/1982 | Boretti | ....................... | 181/226 |
| 4,371,054 A | 2/1983 | Wirt | | |
| 4,419,113 A * | 12/1983 | Smith | .......................... | 55/484 |
| 4,530,417 A * | 7/1985 | Daniel | ......................... | 181/223 |
| 5,145,026 A * | 9/1992 | Wilder | ........................ | 181/233 |
| 5,212,948 A | 5/1993 | Gillingham et al. | | |
| 5,705,777 A * | 1/1998 | Flanigan et al. | ............ | 181/252 |
| 5,767,459 A * | 6/1998 | Sell | ............................. | 181/258 |
| 5,952,623 A * | 9/1999 | Sterling | ..................... | 181/230 |
| 6,082,488 A * | 7/2000 | Lin | ............................. | 181/256 |
| 6,209,678 B1 * | 4/2001 | Sterling | ..................... | 181/230 |
| 6,332,511 B1 * | 12/2001 | Parlato et al. | .............. | 181/282 |
| 6,751,952 B1 * | 6/2004 | Chen | ........................... | 60/407 |
| 6,799,657 B1 * | 10/2004 | Daniels | ...................... | 181/252 |
| 2004/0065504 A1 | 4/2004 | Daniels | | |

FOREIGN PATENT DOCUMENTS

| | | |
|---|---|---|
| CA | 1 155 400 A | 10/1983 |
| DE | 42 13 822 A | 10/1993 |

* cited by examiner

Primary Examiner—Edgardo San Martin
(74) Attorney, Agent, or Firm—Bachman & LaPointe, P.C.

(57) ABSTRACT

A muffler assembly, comprising an outer muffler assembly comprising a plurality of fiberglass discs and a plurality of reactive plates, and an inner muffler assembly comprising a plurality of fiberglass discs and a plurality of reactive plates the inner muffler assembly generally surrounded by the outer muffler assembly and defining therebetween a gas flow gap.

13 Claims, 4 Drawing Sheets

MUFFLER FOR NOISE REDUCTION

BACKGROUND OF THE INVENTION (1) Field of the Invention

The present invention relates to a muffler assembly for dampening acoustic transmission. More particularly, the present invention relates to a muffler assembly for reducing sound transmission in chiller apparatuses.

(2) Description of Related Art

Water cooled chillers used in refrigerator assemblies are required to meet stringent noise level emission standards, such as those prescribed by OSHA. In particular, screw chillers, with low oil flow, tend to emit high levels of noise. The primary source of noise in such systems is the screw compressor.

The noise produced by the compressor is propagated either by gas, or by structure. It is possible to attenuate the intensity of the gas borne noise through the use of a muffler. It is therefore common in the art to employ a single muffler located in the center of a discharge pipe in order to reduce noise level emissions. However, it is often the case that noise level emissions are still above acceptable values even when employing a single muffler as described above.

What is therefore needed is a muffler arrangement for use in refrigerator systems capable of achieving a higher reduction in noise level as compared to that of the art.

SUMMARY OF THE INVENTION

Accordingly, it is an object of the present invention to provide a muffler assembly for dampening acoustic transmission. More particularly, the present invention provides a muffler assembly for reducing sound transmission in chiller apparatuses.

It is a further object of the present invention to provide a muffler assembly which comprises an outer muffler assembly comprising a plurality of fiberglass discs and a plurality of reactive plates, and an inner muffler assembly comprising a plurality of fiberglass discs and a plurality of reactive plates, the inner muffler assembly generally surrounded by the outer muffler assembly and defining therebetween a gas flow gap.

DETAILED DESCRIPTION OF THE PREFERRED EMBODIMENT(S)

It is therefore a central aim of the present invention to teach a muffler assembly for dampening acoustic transmissions. In particular, the present invention aims to reduce the transmission of sound in refrigeration components. As will be described more fully below, the present invention achieves this goal through the use of an outer muffler assembly in which is mounted an inner muffler assembly, the two assemblies being separated by a gas flow gap. Most importantly, the gas flow gap is of a distance equal to approximately ¼ the frequency of the sound to be dissipated.

Figure 1:
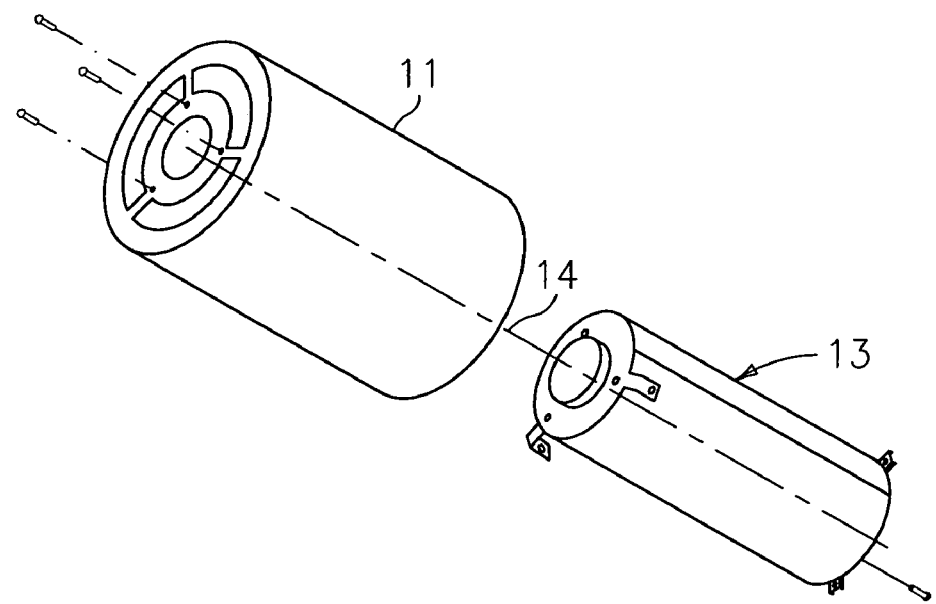
FIG. 1 is an exploded view of the outer muffler assembly and the inner muffler assembly of the present invention.

With reference to FIG. 1, there is illustrated the outer muffler assembly 11 and the inner muffler assembly 13 of the present invention. As illustrated, both outer muffler assembly 11 and inner muffler assembly 13 are generally cylindrical in shape and disposed about centerline 14. While illustrated with reference to cylindrical shapes, outer muffler assembly 11 and inner muffler assembly 13 may be of any shape such that inner muffler assembly 13 may be largely enclosed by and inserted into outer muffler assembly 11.

Figure 2:
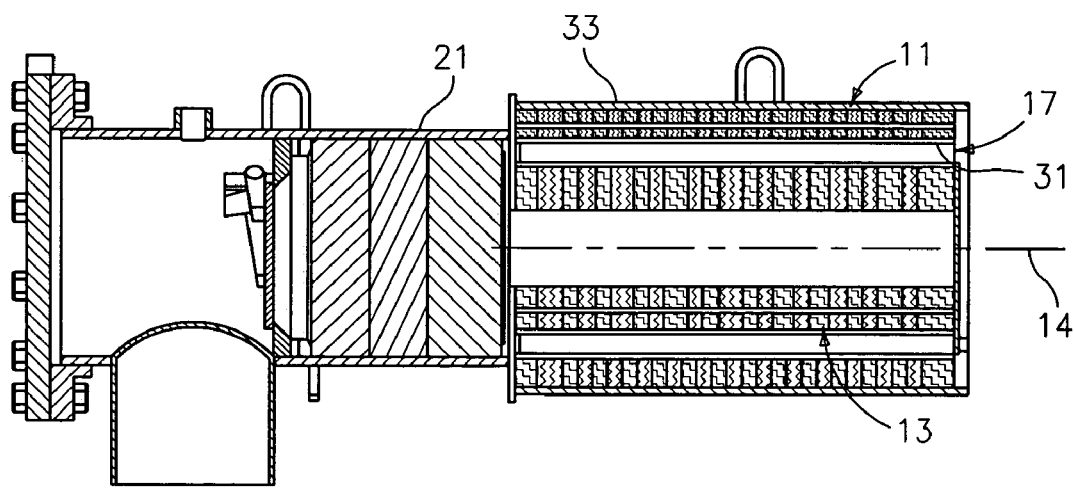
FIG. 2 is a cross-section of the outer muffler assembly and the inner muffler assembly of the present invention attached to a pipe.

With reference to FIG. 2, there is illustrated a cross-section of the muffler assembly of the present invention attached to a pipe 21. As is evident, inner muffler assembly 13 is inserted along centerline 14 so as to fit inside of outer muffler assembly 11. As a result of this configuration, a gas flow gap 17 is formed between the outer periphery of inner muffler assembly 13 and the inside of outer muffler assembly 11. As noted above, the distance of gas flow gap 17 measured at a right angle away from centerline 14 and extending between inner muffler assembly 13 and outer muffler assembly 11 is preferably equal to ¼ wavelength of the frequency to be attenuated. In a preferred embodiment, outer muffler assembly 11 is fastened to inner muffler assembly 13 through the use of bolts or screws. Once fastened to each other, outer muffler assembly 11 and inner muffler assembly 13 are preferably spot welded to pipe 21 at a plurality of points of contact.

Figure 3:
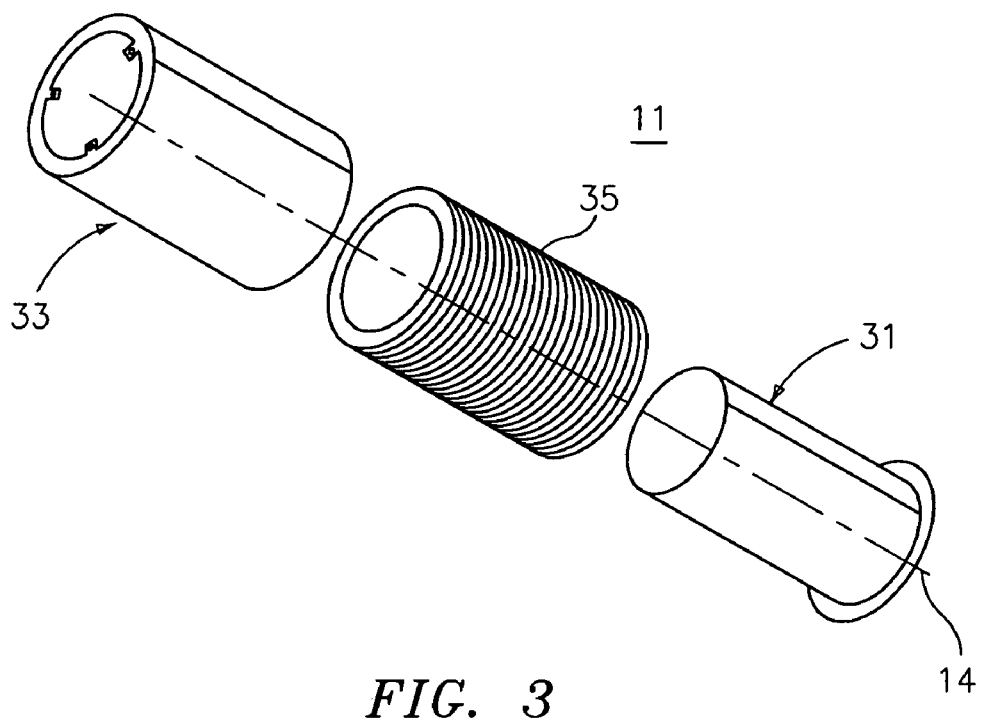
FIG. 3 is an exploded view of the outer muffler assembly of the present invention.

With reference to FIG. 3, there is illustrated in detail the structure of outer muffler assembly 11. Outer muffler assembly 11 is constructed of a fiberglass and reactive liner assembly 35. As will be described more fully below, fiberglass and reactive liner assembly 35 is comprised of a plurality of fiberglass discs and reactive plates. In a preferred embodiment, fiberglass and reactive liner assembly 35 is situated between inner can 31 and outer can 33. Inner can 31 and outer can 33 are preferably two cylindrical cans made out of stainless steel perforated plate with a minimum of 50% open area. The diameter across inner can 31 is approximately equal to the inner diameter of the fiberglass discs and reactive plates. Likewise, the inner diameter of outer can 33 is approximately equal to the outer diameter of the fiberglass disc and reactive plates. As a result, the fiberglass reactive liner assembly 35 fits snugly between inner can 31 and outer can 33. Once inner can 31 is inserted into fiberglass and reactive liner assembly 35, outer can 33 is slid over the assembly and preferably welded to inner can 31.

Figure 4:
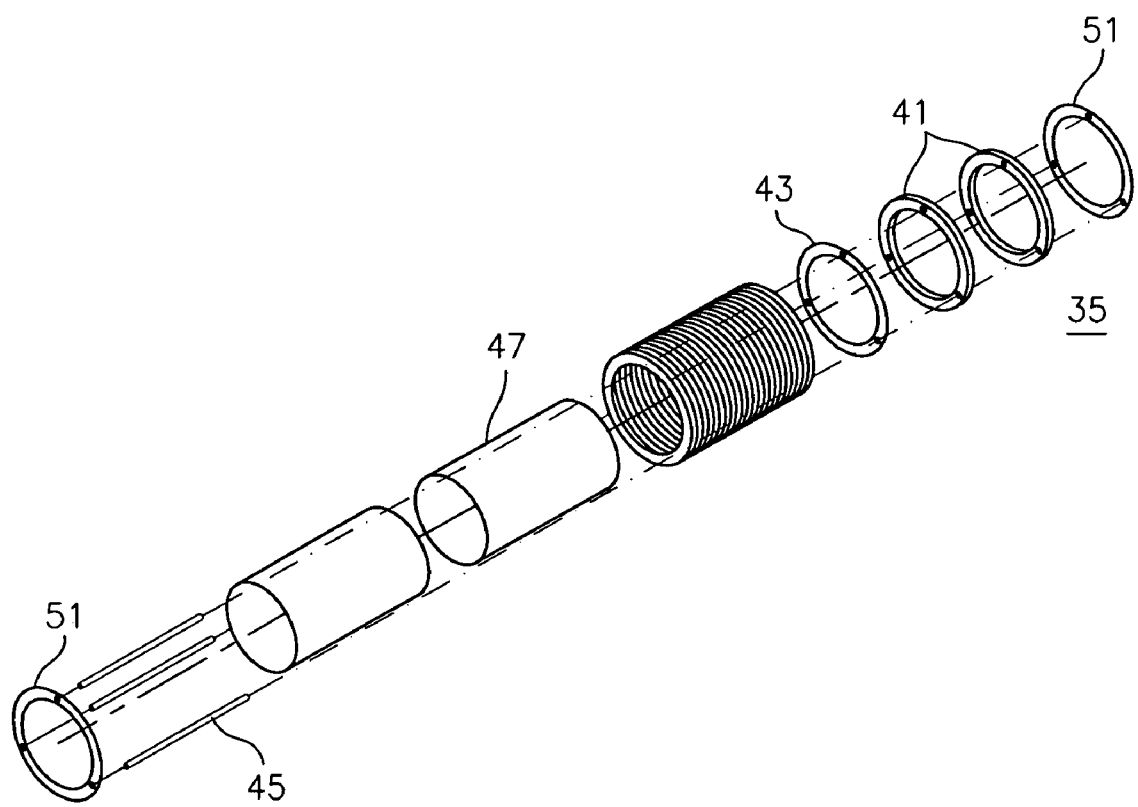
FIG. 4 is an exploded view of the outer muffler assembly of the present invention illustrating the arrangement of the fiberglass discs and the reactive plates.

With reference to FIG. 4, there is illustrated in detail the fiberglass and reactive liner assembly 35. Fiberglass and reactive liner assembly 35 is comprised, for the most part, of noise absorbing fiberglass discs 41 and reactive plates 43. In a preferred embodiment, there are situated two fiberglass discs 41 between each of two reactive plates 43. The purpose of the reactive plates 43 is to act as a reactive element to reflect noise traveling in an axial direction back and forth in the direction of centerline 14. This reflected noise is dissipated as heat in the fiberglass discs 41. In a preferred embodiment, a plurality of holes, preferably three, are drilled in the same position on each of the fiberglass disc 41 and reactive plates 43. A corresponding number of rods 45 is then pushed through the plurality of holes along the length of the assembled fiberglass discs 41 and reactive plates 43. After all of the fiberglass discs 41 and reactive plates 43 are connected in this manner, end plates 51 are attached at either end of the assembly and the fiberglass discs 41 and reactive plates 43 are compressed into tight contact with one another. This compression is important as it provides the correct density for sound attenuation.

Figure 6:
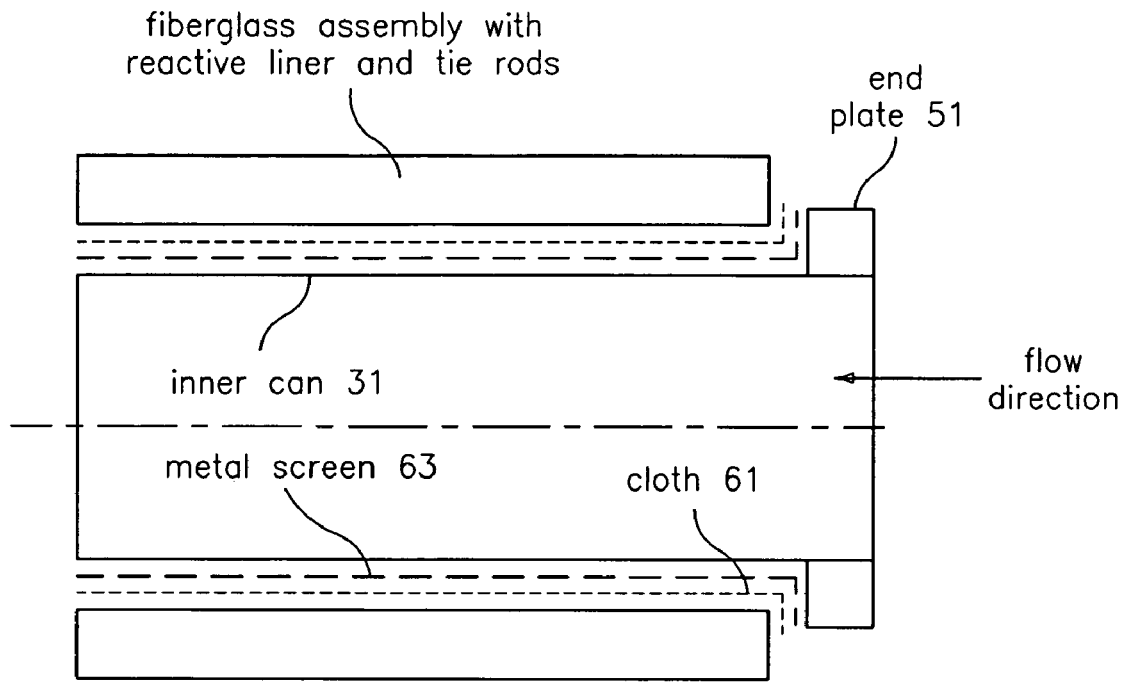
FIG. 6 is an illustration of the construction of the cloth and metal screen of the present invention.

In addition, a polyester cloth 61 may be attached to a metal screen 63 and assembled at the outer diameter of inner can 31 as illustrated in FIG. 6. The cloth 61 and screen 63 are folded onto the end plates 51 so as to prevent fiberglass coming off of the discs 41.

Figure 5:
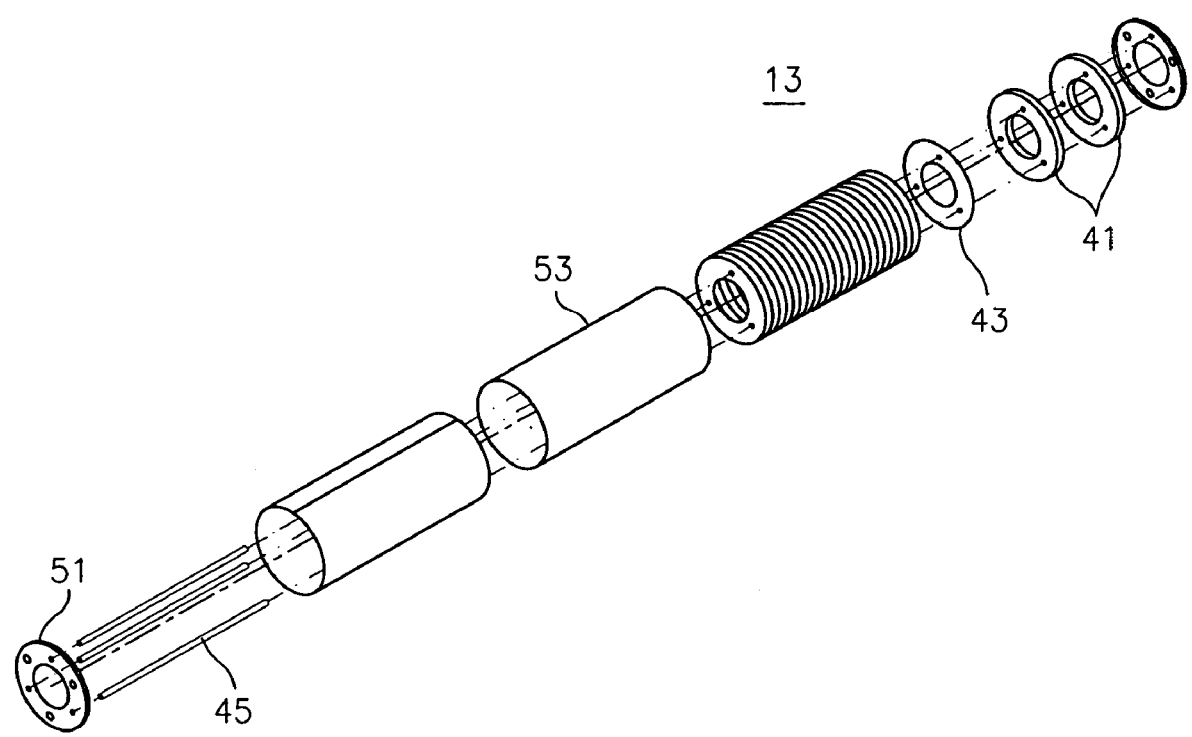
FIG. 5 is an exploded view of the inner muffler assembly of the present invention.
Figure 7:
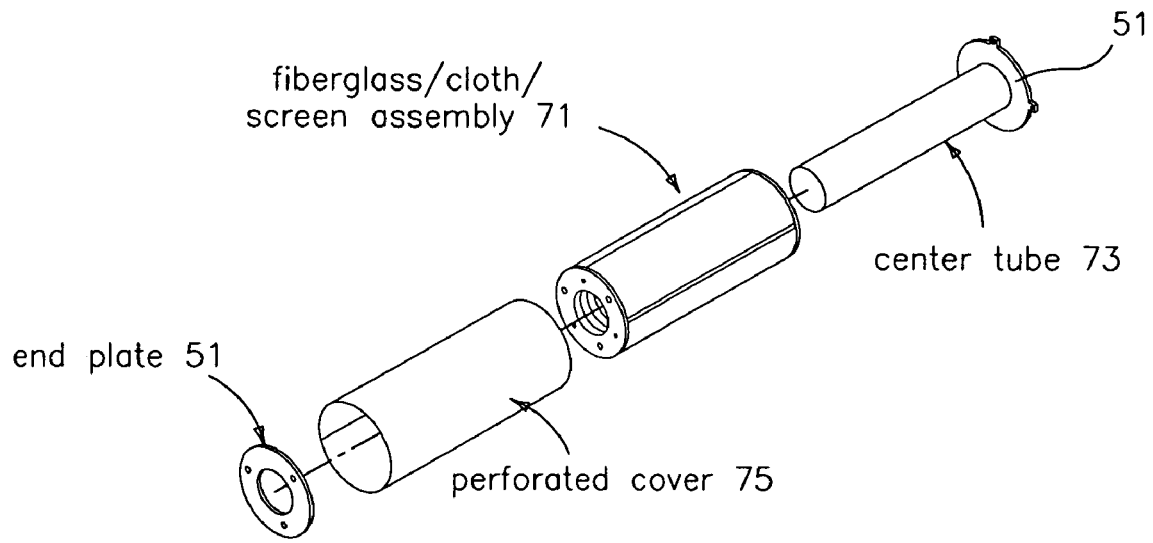
FIG. 7 is a detail of the construction of the inner muffler assembly of the present invention.

With reference to FIG. 5, there is illustrated the inner muffler assembly of the present invention. Note that the construction of the inner muffler assembly 13 is substantially similar to that of the outer muffler assembly 11. With reference to FIG. 7, there is detailed the construction of inner muffler assembly 13. The fiberglass/cloth/screen assembly 71 is slid onto the center tube 73. The end plate 51 is then slid onto the other end and welded to the center. The perforated cover 75 is placed over the assembly 71 and welded to both the end plates 51.

It is apparent that there has been provided in accordance with the present invention a muffler assembly for dampening acoustic transmission. More particularly, the present invention provides a muffler assembly for reducing sound transmission in chiller apparatuses which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A muffler assembly, comprising:
   an outer muffler assembly comprising a plurality of fiberglass discs and a plurality of reactive plates; and
   an inner muffler assembly comprising a plurality of fiberglass discs and a plurality of reactive plates said inner muffler assembly generally surrounded by said outer muffler assembly and defining therebetween a gas flow gap.

2. The muffler assembly of claim 1 wherein said outer muffler assembly comprises:
   an inner can about which are arranged a portion of said plurality of fiberglass discs and said plurality of reactive plates; and
   an outer can surrounding said portion of said plurality of fiberglass discs and said plurality of reactive plates.

3. The muffler assembly of claim 1 wherein at least a portion of said plurality of fiberglass discs and said plurality of reactive plates are arranged in a sequence comprising two fiberglass discs and a reactive plate.

4. The muffler assembly of claim 1 wherein said inner muffler comprises a can encompassing a portion of said plurality of fiberglass discs and said plurality of reactive plates.

5. The muffler assembly of claim 2 wherein at least a portion of said plurality of fiberglass discs and said plurality of reactive plates are arranged in a sequence comprising two fiberglass discs and a reactive plate.

6. The muffler assembly of claim 1, wherein said muffler assembly is communicated with a source of noise having a wavelength, and wherein said gas flow gap separating said inner muffler assembly from said outer muffler assembly is equal in distance to approximately ¼ of said wavelength of said noise.

7. The muffler assembly of claim 1 wherein said muffler assembly is attached to a pipe.

8. The muffler assembly of claim 1 wherein said muffler assembly is welded to said pipe.

9. The muffler assembly of claim 2, further comprising a cloth and screen assembly positioned between the inner can and the plurality of fiberglass discs and reactive plates.

10. The muffler assembly of claim 9, wherein the outer muffler comprises an end plate positioned at at least one end of the plurality of fiberglass discs and reactive plates, and wherein the cloth and screen assembly extends between the end plate and the at least one end.

11. The muffler assembly of claim 10, wherein the cloth and screen assembly comprises a polyester cloth attached to a screen member.

12. The muffler assembly of claim 4, further comprising a center tube having an inner space and passing through the plurality of fiberglass discs and reactive plates, the center tube having a downstream-facing open end, whereby the inner space of the center tube further serves to dampen acoustic transmission.

13. The muffler assembly of claim 1, wherein the reactive plates and fiberglass discs have centers and define a central axis, and wherein the plates and discs are under compression along the central axis.

* * * * *